US011379550B2

(12) United States Patent
Brain et al.

(10) Patent No.: US 11,379,550 B2
(45) Date of Patent: Jul. 5, 2022

(54) SEAMLESS SERVICE ON THIRD-PARTY SITES

(71) Applicant: PAYPAL, INC., San Jose, CA (US)

(72) Inventors: Daniel Brain, San Jose, CA (US); Brandye Sweetnam, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 178 days.

(21) Appl. No.: 15/689,106

(22) Filed: Aug. 29, 2017

(65) Prior Publication Data

US 2019/0065616 A1   Feb. 28, 2019

(51) Int. Cl.
*G06F 3/00* (2006.01)
*G06F 16/957* (2019.01)
*G06Q 30/06* (2012.01)
*G06F 3/0481* (2022.01)

(52) U.S. Cl.
CPC .......... *G06F 16/957* (2019.01); *G06F 3/0481* (2013.01); *G06Q 30/0601* (2013.01)

(58) Field of Classification Search
CPC .. G06F 3/0481; G06F 3/04817; G06F 3/0484; G06F 16/957; G06Q 30/0601
See application file for complete search history.

(56) References Cited

U.S. PATENT DOCUMENTS

| | | | | |
|---|---|---|---|---|
| 6,271,863 B1* | 8/2001 | Bose | ....................... | G06F 40/18 345/440 |
| 7,958,453 B1* | 6/2011 | Taing | .................. | H04L 12/1827 709/204 |
| 8,381,131 B1* | 2/2013 | Rosner | ................ | G06F 3/04817 715/838 |
| 8,452,710 B2* | 5/2013 | Smith | ..................... | G06F 21/00 705/50 |
| 8,935,279 B2* | 1/2015 | Skeen | ................. | H04L 65/4084 707/769 |
| 9,195,834 B1* | 11/2015 | Jakobsson | ............... | G06F 21/31 |
| 9,412,136 B2* | 8/2016 | Gertzfield | .............. | G06Q 50/01 |
| 9,495,714 B2* | 11/2016 | Bush | ...................... | G06Q 50/01 |
| 10,585,978 B2* | 3/2020 | Hollingsworth | ....... | G06F 3/0482 |
| 2007/0226640 A1* | 9/2007 | Holbrook | .............. | G06F 16/951 715/765 |
| 2009/0100377 A1* | 4/2009 | Miyamoto | .......... | G06F 3/04817 715/810 |
| 2010/0174620 A1* | 7/2010 | Stringfellow | .......... | G06Q 20/02 705/26.1 |
| 2010/0332969 A1* | 12/2010 | Jayaraman | .......... | G06F 16/9577 715/234 |
| 2011/0061002 A1* | 3/2011 | Bethune | .................... | G06F 8/38 715/744 |
| 2011/0208603 A1* | 8/2011 | Benefield | ............. | G06Q 20/202 705/21 |
| 2011/0314413 A1* | 12/2011 | Kunkier | ................. | G06Q 40/00 715/781 |
| 2012/0089659 A1* | 4/2012 | Halevi | ................ | G06F 3/04842 709/201 |

(Continued)

*Primary Examiner* — Tadesse Hailu
*Assistant Examiner* — Andrew Chung
(74) *Attorney, Agent, or Firm* — Haynes and Boone, LLP

(57) ABSTRACT

A system for embedding services into a third-party website includes providing first programming code that can be used as part of a webpage that causes a user device to display a first iframe, display a second iframe in response to user input provided through the first iframe.

20 Claims, 5 Drawing Sheets

(56) References Cited

U.S. PATENT DOCUMENTS

| | | | |
|---|---|---|---|
| 2012/0123924 A1* | 5/2012 | Rose | G06Q 20/3276 705/35 |
| 2012/0158513 A1* | 6/2012 | Schoen | G06Q 30/0269 705/14.66 |
| 2012/0266084 A1* | 10/2012 | Liao | G06F 16/54 715/753 |
| 2013/0060869 A1* | 3/2013 | Davis | G06Q 10/107 709/206 |
| 2013/0137464 A1* | 5/2013 | Kramer | G06Q 30/02 455/456.3 |
| 2013/0139073 A1* | 5/2013 | Crames | G06F 9/44505 715/760 |
| 2013/0198643 A1* | 8/2013 | Yang | G06F 3/0481 715/739 |
| 2013/0339233 A1* | 12/2013 | Lee | G06Q 20/36 705/41 |
| 2013/0346302 A1* | 12/2013 | Purves | G06Q 20/102 705/40 |
| 2014/0012749 A1* | 1/2014 | Lee | G06Q 20/10 705/40 |
| 2014/0052617 A1* | 2/2014 | Chawla | G06Q 20/12 705/39 |
| 2014/0068456 A1* | 3/2014 | Chan | G06F 9/451 715/747 |
| 2014/0089135 A1* | 3/2014 | Linh | G06Q 30/0643 705/26.7 |
| 2014/0218759 A1* | 8/2014 | Pridmore | G03G 15/5075 358/1.15 |
| 2014/0281888 A1* | 9/2014 | Rego | G06F 40/106 715/234 |
| 2014/0337168 A1* | 11/2014 | Laorauvirodge | G06Q 30/0633 705/26.8 |
| 2015/0089354 A1* | 3/2015 | Abrahami | G06F 16/958 715/235 |
| 2015/0154588 A1* | 6/2015 | Purves | G06Q 30/0226 705/14.27 |
| 2015/0178252 A1* | 6/2015 | Dunn | G06F 17/2247 715/234 |
| 2015/0249872 A1* | 9/2015 | Lee | G06Q 30/06 725/32 |
| 2015/0286997 A1* | 10/2015 | Zimmerman | G06Q 20/10 705/39 |
| 2015/0339276 A1* | 11/2015 | Bloem | H04L 67/42 715/234 |
| 2015/0350463 A1* | 12/2015 | Moore | G06F 3/04845 715/743 |
| 2015/0371326 A1* | 12/2015 | Montesano | G06Q 20/4016 705/38 |
| 2016/0005030 A1* | 1/2016 | Girish | G06Q 20/322 705/39 |
| 2016/0247233 A1* | 8/2016 | Page | G06Q 20/405 |
| 2016/0371751 A1* | 12/2016 | Cohen | G06Q 30/0277 |
| 2016/0378321 A1* | 12/2016 | Sirpal | G06F 16/316 715/765 |
| 2017/0213200 A1* | 7/2017 | Purves | G06Q 20/227 |
| 2017/0351996 A1* | 12/2017 | Fetman | G06Q 10/087 |
| 2019/0065613 A1* | 2/2019 | Bilsten | G06F 16/434 |
| 2019/0312990 A1* | 10/2019 | Suiter | H04N 1/212 |

* cited by examiner

SEAMLESS SERVICE ON THIRD-PARTY SITES

TECHNICAL FIELD

The present disclosure generally relates to system and methods of allow for a system to control the experience of a third-party website, and more specifically control the experience of the third-party website through the use of inline frames (iframe(s)).

BACKGROUND

A current set of problems associated with providing services on a third-party website is user information security and redirects. Often, to provide a service on a third-party website, a link for a redirect is created that takes the user from the third-party website to the service provider website. This can be a frustrating experience as the user may not understand that the redirect is part of the service associated with the third-party website, or the service provider site may not present information that is readily available on the third-party website. Furthermore, users will find that redirects are a jarring experience that causes confusion and uncertainty.

Another option for providing services with a third-party website is pop-up windows. However, pop-up windows may be blocked by a browser or hidden, causing the user anguish when trying to use the service of the service provider. Furthermore, pop-up windows are notoriously used for fraud, and are not generally trusted by users. As such, Applicants recognize that there is a need for a way to embed services on a third-party webpage without redirects or pop-up windows. It would be further beneficial if there were a way such that the embedded services could be specified by the third-party website so that the look and feel of the embedded services match the look and feel of the third-party website. Additionally, it would be beneficial if the service could be provided in a manner that isolates the third-party webpage from handling private user information. It would also be convenient if the service provider could effectively commandeer the webpage temporarily to control the user experience and the service flow. Solutions to the above problems and desired features are disclosed along with other advantages in this disclosure.

Figure 1:
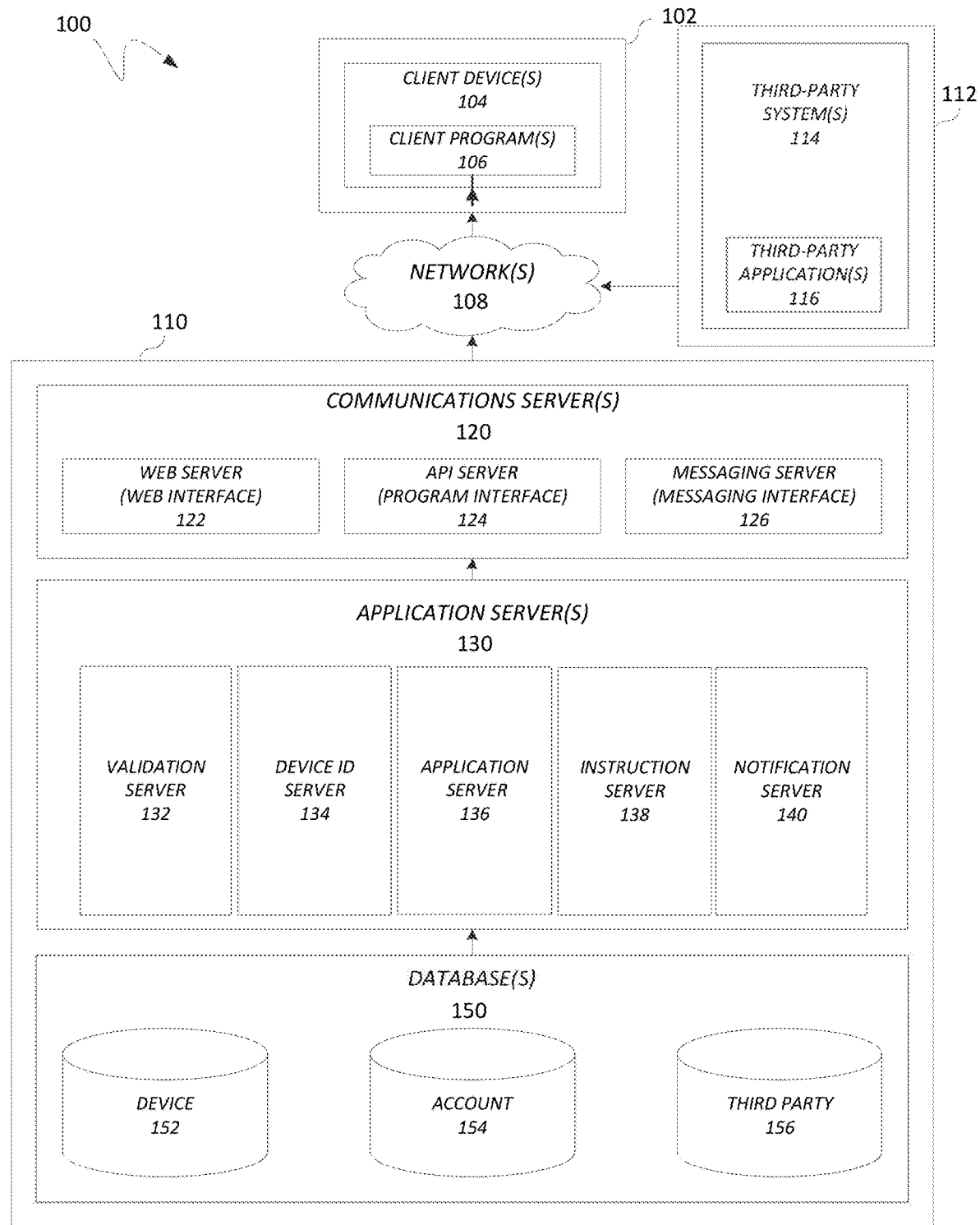
FIG. 1 is a block diagram of an example computing system that is adapted for seamless service on third-party sites using iframes.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Some embodiments of the present disclosure enable a service provider to run a service seamlessly within a third-party web site. The service provider may provide a portion of source code that can be integrated into the course code of a third-party website such that when the third-party website is rendered by a user device, the service provider service is embedded into the third-party website. The portion of source code provided may implement application interface (API) calls to the service provider system. Some of the API calls may specify to and/or instruct the service provider system how the elements handled by the service provider system should look (e.g. color, size, location, font, shape, etc.). In this manner, a third-party website can provide details to the service provider system on how to integrate the services provided by the service provider system seamlessly with the rest of third-party website even though those elements may be handled and/or hosted by the service provider system rather than the third-party. For example, the third-party website may use a particular color scheme and/or font, and the portion of the source coded provided the service provider may be edited to instruct and/or specify the color scheme to the service provider system to be used. In this manner, if the website generally has blue buttons, the API calls can request that the service provider system also use blue buttons for buttons being hosted and/or embedded into the website by the service provider system. This may also apply to other settings associated to the look and feel of the website, such as font, size, shapes, and/or the like.

In some examples, the API calls may be executed or rendered by a webpage on a user device to request a client connection with the service provider system and initiate the creation of an iframe. In some examples, the iframe may be hosted and/or generated by the service provider system. In some embodiments, the iframe may be generated by the user device through a web browser rendering the third-party website. In some examples, the user device may generate the iframe by rendering a portion of source code, which a third-party may have obtained from the service provider, embedded into the third-party website source code.

The iframe may enable a communication between the user device and the service provider system allowing the service provider system to control at least a portion of the webpage. In some examples, there may be more than one iframe initiated, some may be parallel iframes and some may be child iframes with a parent iframe associated with the child iframe.

In some embodiments, the portion of source code provided by the service provider may additionally cause a web browser of a user device to await and/or anticipate a trigger from the service provider system to initiate one or more child iframes. In some examples, the code to generate the child iframe may be obtained from the third-party webpage. In some examples, the child iframe may be hosted and generated by the service provider system through the client connection and/or communication through the parent iframe. In some examples, the service provider system may provide code for execution by the user device to generate the child iframe.

The child iframe, in some examples may encompass some or all of the viewport portion of the web browser. In this manner, the service provider system may essentially control the flow of the third-party website, such as what is shown in the view port, what links are available for clicking, and/or the general user experience. The child iframe may allow the service provider to complete a service for the user without the user's input being communicated to the third-party. The child iframe may allow for the service provider system to host and embed its services into a third-party website. In this manner passwords, financial information, user information, and/or the like may be protected. Furthermore, in response to completion or cancellation of the service provided by the service provider system, the child iframe may be closed and access to one or more features of the third-party website may be enabled. Additionally, communication between the child iframe and parent iframe may allow for the service provider system to change the elements in the child iframe and/or parent iframe in response to certain actions. For example, the user device may communicate to the service provider system that the child iframe has been closed such that the service provider system can change an element in the parent iframe, such as a button or information, and/or close the parent iframe. This would allow the service provider system to close iframes in the order that the iframes were opened using indications from the user device. Furthermore, the service provider system can update the information in the parent iframe upon closure of the child iframe, such as updating quantities, indicating cancellation, confirming completion, and/or the like. Furthermore, through the use of third-party and user device identifiers as discussed in the embodiments below, the services provided by the service provider can be segregated yet combined to form a single combined service. For example, the third-party website may have a service that includes steps 1-5 and a service provider may provide services with steps A-F. Another service may be created by combining the third-party service and the service provider service. The new combined service may have the steps from the third-party and service provider to be inter-stitched (E.G. steps 1-3, A-C, 4-5, E-F). Through the embodiments disclosed herein, the steps from the two difference service providers may be combined in experience for the user but may in reality be segregated, such that the information provided by the user for each step goes to the respective handler of the service. One such example may be payment processing combined an online market catalogue. One site can handle the market catalogue, viewing, shipping, etc. while the other handles the payment. The user data associated with browsing and selecting objects in the market may be handled by a market website without sharing the information to the payment site, and the user data associated with banking, payment, login, and transfer may be handled by the payment website without sharing it, yet all of it may be handled in a single webpage (rather than through redirects and/or pop-up windows).

FIG. 1 illustrates, in block diagram format, an example embodiment of a computing system adapted for implementing a system for merchant item identification. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party devices 114 hosting third-party applications 116. In various implementations, third-party devices 114 and/or third-party applications 116 may host applications associated with or employed by a third party 112. For example, third-party devices 114 and/or third-party applications 116 may enable network-based system 110 to provide client 102 and/or system 110 with additional services and/or information, such as merchant information, data communications, payment services, security functions, customer support, and/or other services, some of which will be discussed in greater detail below. Third-party devices 114 and/or third-party applications 116 may also provide system 110 and/or client 102 with other information and/or services, such as email services and/or information, property transfer and/or handling, purchase services and/or information, and/or other online services and/or information.

In one embodiment, third-party system 114 may include one or more servers, such as a web server that hosts a website. In some embodiments, third-party system 114 may include a merchandise database that can provide information regarding different items and/or products for sale. In some examples, third-party severs 114 may include one or more servers for aggregating user data, purchase data, and other statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services including but not limited to payment services, monetary transfers, checkout processing, data gathering, data analysis, security, account management, and other services to users that access network-based system 110. In various embodiments, client devices 104 and/or third-party devices 114 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party devices 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various services to clients including, but not limited to, payment services, security services, authentication services, and/or any other service. Application server 130 of network-based system 110 may provide and/or handle services for a third-party such as payment processing, security, authentication, and/or the like. Application servers 130 may include a validation server 132, device identification server 134, application server 136, instruction server 138, and notification server 140. These servers, which may be in addition to other servers, may be structured and arranged to configure the system for provide services on third-party websites.

Application servers 130, in turn, may be coupled to and capable of accessing one or more databases 150 including a device database 152, an account database 154, and/or third party database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
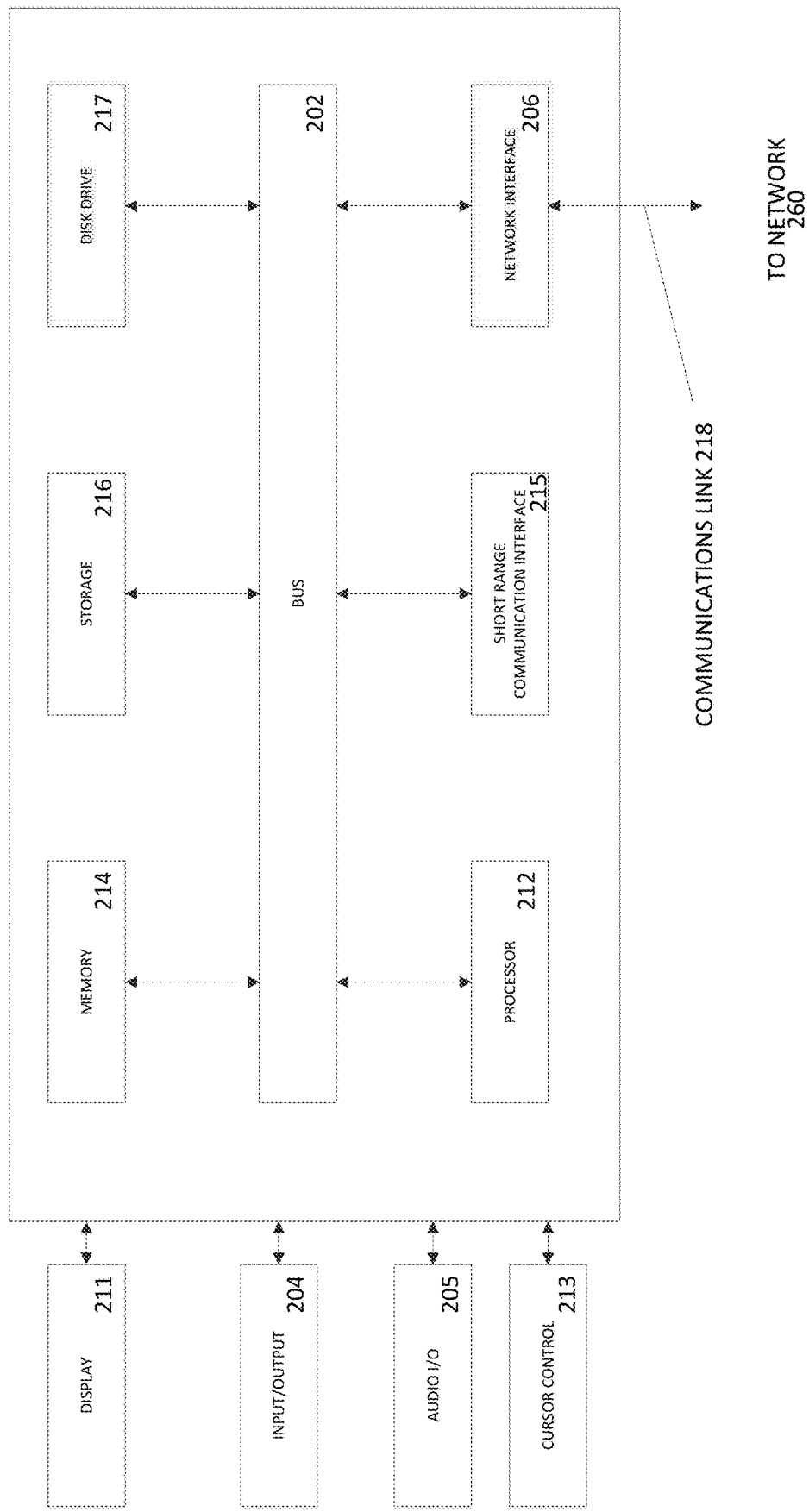
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows.

Additionally, as more and more devices become communication capable, such as new smart devices using wireless communication to report, track, message, relay information and so forth, these devices may be part of computer system 200. For example, windows, walls, and other objects may double as touch screen devices for users to interact with. Such devices may be incorporated with the systems discussed herein.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touchscreen, etc.). In some examples, I/O component 204 may include an image sensor for capturing images and/or video, such as a complementary metal oxide semiconductor (CMOS) image sensor, and/or the like. An audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, images, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory such as system memory component 214, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
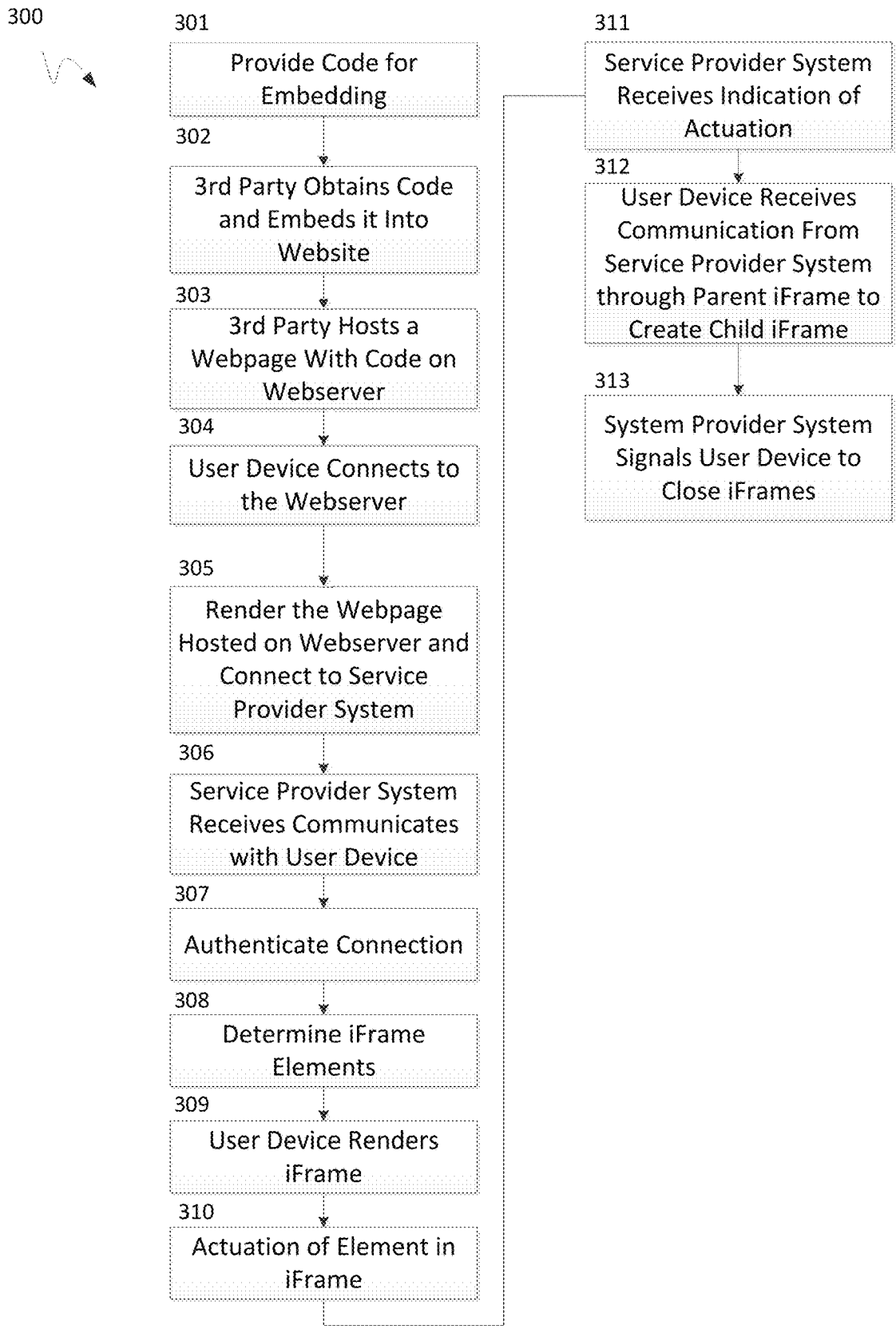
FIG. 3 is a flow diagram illustrating an example process for implementing seamless service on a third-party site.

FIG. 3 illustrates example process 300 that may be implemented by a system for enabling seamless service on a third-party website. Process 300 may be implemented on a system such as system 100 of FIG. 1 according to some embodiments. According to some embodiments, process 300 may include one or more of operations 301-313, which may be implemented, at least in part, in the form of executable code stored on non-transitory, tangible, machine readable media that, when run on one or more processors, may cause a system to perform one or more of the operations 301-313.

At operation 301, a service provider system may provide and/or distribute code to third parties for hosting on a third-party webserver and/or embedding in a third-party website. In some examples, the service provider system may provide API for providing and embedding services provided by the service provider system on a third-party website. The API may allow for customization on styles and appearances of embedded elements.

The code may include instructions and/or executable code that, in response to execution of the code through a web browser of a user device, causes a user device to create one or more iframes in a rendered webpage and connect with the service provider system. In some examples, the executable code may cause the user device to communicate API calls to the service provider system and/or one or more identification tokens for the service provider system to distinguish/identify the user device and/or the third-party websites from other user devices and/or third-party websites. In some examples, the code may be embeddable code displayed on a webpage for embedding into a third-party website (e.g. copy pasting the distributed code into the source code of a website). In some examples, the code may be sent in an electronic message, sent as one or more files (e.g. JavaScript file), stored on a code repository (e.g. GitHub) for public access, and/or the like. The code may include portions that are directed to the user interface configurations and/or the look and feel of the iframe when executed by a user device. For example, portions of the code may be edited to customize font, color, size, location, and/or the like of how certain embedded website elements are displayed. In this manner, a third-party may use the code to embed, include, and/or enable services from the service provider in the webpages of the third-party without having to develop those services themselves.

At operation 302 a third-party system may obtain the code provided at operation 301 and embed it into a third-party website source code. In some examples, the code may be modified such that the look and feel of the embedded elements are different from the original code, however, the API calls and other function calls may generally remain unchanged. For example, the code may be changed so that fonts and colors used for the embedded elements match the fonts used for the rest of the third-party website. For example, the third-party may change certain aspects of the style of any embedded elements by specifying style sheet language variables for color, font, font family, font size, font size adjustment, font stretch, font style, font variant, font variant alternates, font variant for capitals, font variant for East Asian languages, font variant ligatures, font variant for numbers, font weights, line heights, outlines, opacity, text shadow, transitions, font smoothing for each sensitive data field utilized by the merchant, and/or the like. Embedded elements may include data entry fields, text, images, and/or the like. In some examples, the embedded elements may be hosted on the service provider system.

Additionally, the third-party may edit the code to change the size and location of frames, such as the iframe. However, other portions of the provided code may stay the same, such as the instructions to generate an iframe, connect and create a client connection to the service provider system, generate identification tokens, provide identification tokens to the service provider system, requesting a client instance from the service provider system, and/or the like.

At operation 303, the third-party system may host the webpage with the provided coded embedded, as discussed in operation 302, on a webserver. In this manner, a user device may connect and request the webpage from the webserver and render the webpage using a web browser (e.g. the user device may retrieve and execute the programming code instructions of the webpage using a processor).

At operation 304, a user device may request, obtain, and render the webpage hosted by the third-party webserver at operation 303. For example, a user device may make a request to a URL (which a DNS may translate into an IP address of the webserver) for the webpage, and in response, the webserver may provide the webpage to the user device. In some examples, the request may be in response to user input instructing the user device to connect to the URL using a web browser.

At operation 305, The user device may render the webpage by executing the source code of the webpage. In the process of executing the code of the webpage, the user device may execute the provided code in operation 301 that is within the webpage source code. In some examples, the provided code may include instructions for the user device to connect to the service provider system and render code from the service provider system in an iframe. In some examples, the provided code may include instructions for the user device to connect to the service provider system, and the service provider system may provide code to the user device that causes the user device to render an iframe, in response to execution. In some examples, the provided code may cause the user device to communicate with the service provider system, which may include sending device information, website information, cookies, API calls, and/or the like.

At operation 306, the service provider system may receive a communication from the user device. In some examples, the user device may be the connection request in operation 305. The connection request may include additional information that identifies the third-party system, the user of the user device, the user device, and/or the like. In some examples, the identifying information may use digital tokens for identification.

At operation 307, the service provider system may authenticate the user, user device, and/or third-party or authorize the user device to connect with the service provider system. In some examples, the service provider system may check to ensure that the user device is connecting with the service provider system in response to connecting with a registered third-party. For example, the service provider system may compare a digital token with a database of digital tokens to determine whether the token matches with one associated with a registered third-party. In some examples, the user device may provide or relay, from the third-party webserver, the digital token. In some examples, the service provider system may communicate with the third-party system to ensure that the user device connected with the third-party webserver and retrieve the digital token from the third-party system in response to the third-party system ensuring that the user device communicated with the third-party system. In some examples, the service provider system may provide an identifier of the user device to the third-party system such that the third-party system can differentiate the user device from other connected devices.

At operation 308, the service provider system may determine the embedded elements for the user device to display in an iframe. In some examples, the configurations of the embedded elements may depend on input received as part of an API call. For example, the API call may indicate the size, color, font, language, and/or other stylistic choices for the embedded elements. In some examples, at least a portion of the stylistic choices may be dictated by the third-party through changes made to the provided code before hosing the provided code on the third-party webserver.

In some examples, at least a portion of the configurations of the embedded elements may be based on user information, user settings, and/or user device information. For example, the user of the user device may have personalized settings for an account, such use of certain images. In some examples, the service provider system may have a customized user button as one of the embedded elements. The button may have an image of the user or an image chosen by the user. The service provider system may use the customized user button or other element based on the user setting. The service provider system may determine to use such an embedded element by identifying the user, which may include matching information received from the user device. For example, the user device may provide device identification information, user information, HTML cookies, electronic tokens, and/or the like for the system provider device to match in a database for identifying the user and the user settings.

As customizations, the service provider system may include elements that are associated with the user account, such as information about the account, name, addresses, identifiers, images, balances, and/or the like. In some example, the service provider system may include multiple flows or services and may determine which flow or service to provide based on user preferences, device information, device capabilities, application availability on the device, and/or the like. For example, the service provider system may have two or more different payment services and may provide an actuatable element associated with one or more of the different services depending on the information received regarding the device information, device capabilities, applications on the device, device compatibility and/or the like. In some examples, such as for payment services, the system may select a flow and/or actuatable element based on balance. As an example, PayPal® may pick between the PayPal® checkout process versus the Venmo® checkout process (both of which are part of PayPal®). Additionally, there may be a mobile vs desktop checkout process to choose from as well and may be selected based on the device information.

At operation 309, the user device may display the iframe elements determined by the service provider system at operation 308. In some examples, depending on the configurations of the webpage, provided code, the service provider system, and the APIs, the service provider system may host the iframe for display in the webpage of the user device through a client connection. The user device may communicate with the system provider that will provide the executable code for rendering the iframe. The user device may, in response to executing the provided code portion of the third-party website source code, anticipate a trigger from the service provider system for creating one or more iframes through a client connection. Furthermore, the elements displayed within the iframe may be hosted by the server provider system. In some examples, the user device may execute provided code retrieved from the webserver of the 3rd party webserver to create the one or more iframes. In some examples, the user actions conducted within the iframe may be communicated by the user device to the service provider system without communicating the actions to the 3rd party system.

Prior to embodiments discussed herein, having customized elements tailored for a user on a website provided by an entity other than the entity hosting the website were not possible. As such, the benefit of this embodiment is allowing for customized user experience on a website wherein the customizations are dictated by a party other than the party hosting the source code of the website. A normal interaction would be user device A renders a website hosted by entity B and entity B has complete control over the look and feel of the website. In these embodiments, user device A renders a website hosted by entity B, however, some or all of the elements of the website are customized and dictated by entity C and/or the website control is commandeered by entity C. Furthermore, these embodiments enables a user device to interact with a website and provide information to entity C without having the information sent to entity B. Thus, private information can be passed to entity C on entity B's website without going through entity B and without having to open a separate pop-up window to entity C's website.

In some examples, the iframe may contain a trigger, such as a button or some other actuatable element, that, when actuated by a user through the user device, sends a communication, such as an alert, to the service provider system. In some embodiments, the user device may, in response to executing the provided code portion of the third-party website source code, may anticipate a trigger from the service provider system for creating one or more iframes. In some embodiments, the user device, in response to executing code received from the service provider system through a client connection of the iframe in operation 309, may anticipate a trigger from the service provider system for creating one or more iframes.

At operation 310, a user may actuate an actuatable element in the iframe displayed on the user device at operation 309. In response to the actuation, the user device may communicate a signal to the service provider system indicating the actuation of the actuatable element. In some examples, the communication may be a mouse click and the location of the mouse click within the iframe. In some examples, the communication may be an indicator notifying the service provider system that the used actuated the actuatable element.

At operation 311, the service provider system may receive the indication that the actuatable element was actuated, as discussed in operation 310. In response to receiving the indication, the server provider system may communicate to the user device a trigger or instructions for the user device to implement one or more additional (sometimes referred to as child) iframes for displaying embedded elements determined by the service provider system.

At operation 312, the user device may receive the communication from the service provider system discussed in operation 311 for creating additional iframes, which may be an anticipated trigger as discussed in operation 309. In response to receiving the user device may implement instructions, which may be from the provided code within the source code of the website and/or from the service provider system in the communication discussed in operation 309, to implement one or more additional iframes. In some cases, the instructions may be rendered through a web browser of the user device. In some examples, the creation of the one or more additional iframes may be through execution of code received from the service provider system through the connection of the one or more initial (sometimes referred to as parent) iframes. In some examples, the additional iframes may be created through execution of code received from an additional communication channel associated with an additional client connection to the service provider system. The creation and/or display of the additional one or more iframes may be created in a similar manner as the initial iframes, however, the instructions to create the one or more additional iframes may come from the service provider system and through a communication channel associate with one or more of the initial iframes and/or client connections used for the initial iframes as discussed in operation 309. In some examples this additional one or more iframes may be configured to encompass at least half of the viewport of the browser window. In some examples, the one or more additional iframes may encompass 70% or more of the viewport of the web browser window. In some examples, the one or more iframes may encompass 100% of the viewport. In such an example, the service provider system may have total control of what is displayed in the viewport and/or what interactions are available to the user. In some examples, the service provider system may completely commandeer the website. The one or more additional iframes may overlay on top of the one or more initial iframes and/or other content on the webpage. The one or more additional iframes may include partially transparent portions such that some portions of the webpage that the one or more additional iframes overlay is viewable through the iframe. In some examples, the partially transparent portions of the one or more additional iframes may create the illusion that the webpage is greyed out by using a semitransparent colored overlay. As such, the iframes can effectively change the color of the webpage. The additional one or more iframes may be hosted on the service provider system and used to communicate with the user device to provide one or more online services with limited or without the user device having to communicate with the third-party webserver. This is especially useful for allowing the service provider system to track user data and communicate user private information without having to relay the information through the third-party webserver. In this manner, the service provider can conduct services in compliance with one or more security measures without the third-party system needing the same level of compliance. For example, due to security requirements for preventing fraud and identity theft, online finance services often must comply with several security standards that are significantly higher than what a website that does not provide financial services would normally comply with. Such security measures as encryption levels, standards for information security, compliance with laws regarding sharing private information, location of stored information, access, and/or the like. The use of iframes in the manner discussed above allows the service to be segregated from the third-party system. Furthermore, there is an improvement over older system, which used redirects and/or popup windows for segregating the third-party system from the service provider system. In this manner, the service provider services can be embedded in the same webpage as the third-party system webpage without a popup window or one or more redirects.

At operation 313, the service provider system may send a signal to the user device to close out one or more of the initial and/or additional iframes, which may relinquish, at least in part, control of the available user interactions with the website. In some examples, this close out signal may be provided upon an end of the use of the service determined by the service provider system. The end of use may be after the completion of a service to the user and/or third-party by the service provider system (complete with confirmations that may be sent to and from the user device and/or third-party system), cancellation of the service (which may be conducted by the user device and/or the third-party system), and/or the like. The service provider system may end one or more client sessions associated with the one or more initial and/or additional iframes. The service provider may communicate instructions on closing out the one or more initial and/or additional iframes. In some examples, the service provider system may instruct the user device to close one or more additional iframes and communicate back to the service provider system through the client connection of one or more of the initial iframes and indication that the closure of the one or more additional iframes. As such, the server provider system can close iframes in a cascading manner from child to parent iframes, which may be the reverse order in which the iframes were created. Furthermore, the parent iframe(s) can be updated and/or changed by the service provider system based on the actions and/or the closure of the child iframe(s) spawned from the parent. In this manner, a service provider system may be provided control of an experience on a third-party website for certain flows and/or services without having to create the third-party website. Furthermore, updates and changes to the flows can be made by the service provider system without having to change the source code hosted by the third-party system because the server provider system uses a host client connection to provide the experience handled by the service provider system.

The above embodiment is provided only as an example and modifications may be made without departing from the scope and spirit of this disclosure. For example, in some embodiments, the ordering of various steps described herein may be changed, certain steps may combined into composite steps, some steps may be separated into sub-steps, and/or one or more steps or sub-steps may be omitted. Furthermore, the steps may be performed by different entities or some of the entities may be merged, for example the third-party hosting the webpage may be part of the service provider system hosting the webpage on its own webserver.

Figure 4:
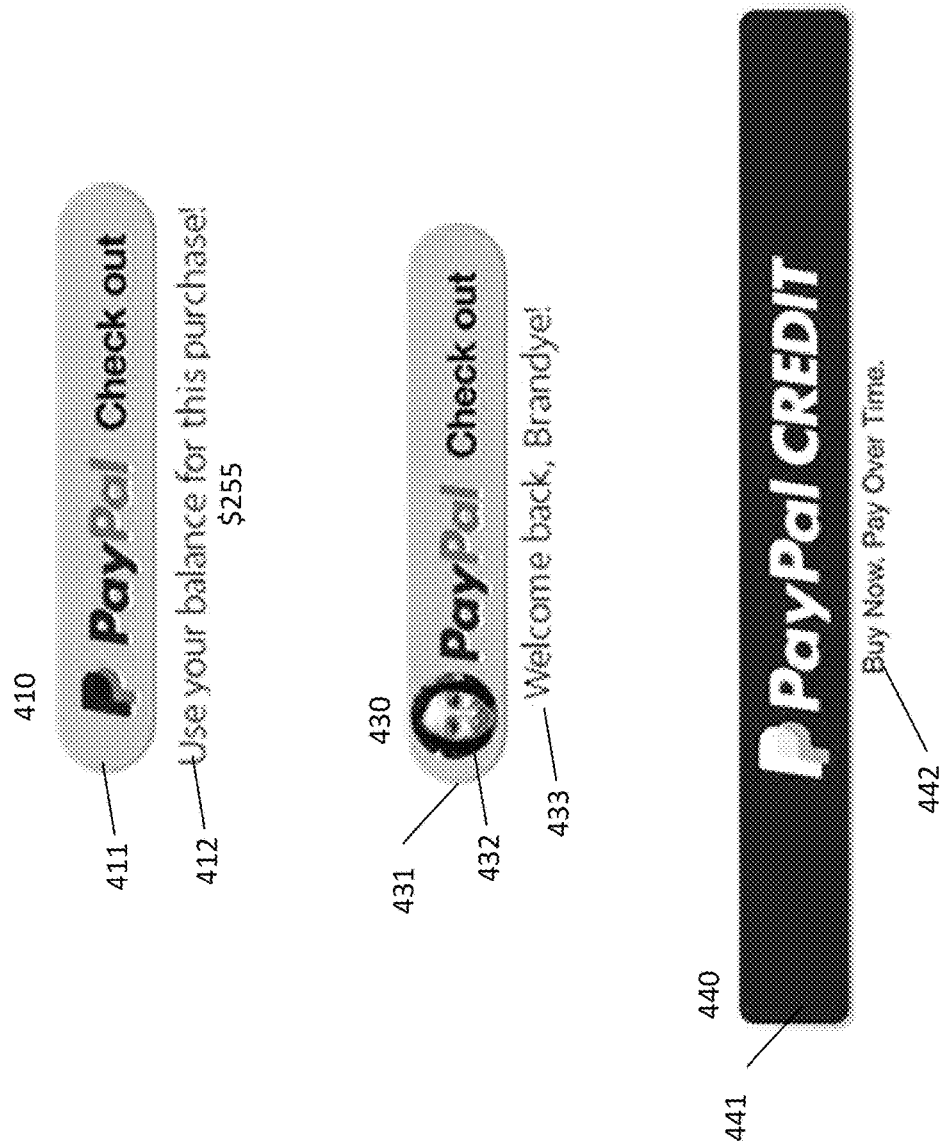
FIG. 4 illustrates example iframe elements and functionalities that may be used as part of the process discussed in FIG. 3.

FIG. 4 illustrates several different actuatable elements (410, 430, and 440) that may be used within an embedded iframe as discussed above when describing process 300 in FIG. 3. As discussed above, one or more of actuatable elements 410, 430, and 440 may be hosted by a service provider system and displayed in an iframe of a webpage on a user device (the webpage having been provided by a third-party), as discussed above. In this manner, the service provider system has control of the look and feel of the actuatable elements, and in some examples, control of the entire user interaction with the webpage.

As shown, actuatable element 410 has image 411, which the service provide may determine the color, look, size, orientation, and/or the like used for the actuatable element. In some examples, the service provider system may determine image 411 based on values provided in an API call provided to the service provider system. In some examples, service provider system may determine image 411 based in information received regarding the user device displaying the actuatable element. For example, as shown with actuable element 430, image 431 includes an image of the user 432. In some examples, the service provider system may determine to use image 431 with image of the user 432 instead of image 411 as the actuatable element based on information received from the user device, such as a device identifier that matches a device identifier registered to the user. Image 432 may be have been provided by the user as part of a registration and/or user preference associated with the user account. In some examples, the service provider system may obtain the image from one or more applications licked with the service provider, such as a social media account.

In some examples, the service provider system may chose image 441 as the image. This image may be chosen based on one or more factors, such as the available applications on the user device, the amount of money the user has in their account, the price of the object being purchased, whether the user is signed up for this particular service, and/or the like. Although, the actuatable elements shown in this example are related to payment related service, the buttons may be used for other services and customized based on the information associated with those services.

Additionally, a customized message, such as 412, may be provided by the service provider system in the iframe with actuatable element 410, 430, and/or 440. The service provider system may determine the message to display based on one or more factors, such as information about the user account (such as a balance), the last time the user used the account, and/or other information about the account. For example, message 412 may be based on the balance in the account of the user. Message 433 may be based on the last time the user logged in, or as a default message. Message 442 may be based on the type of image used.

Figure 5:
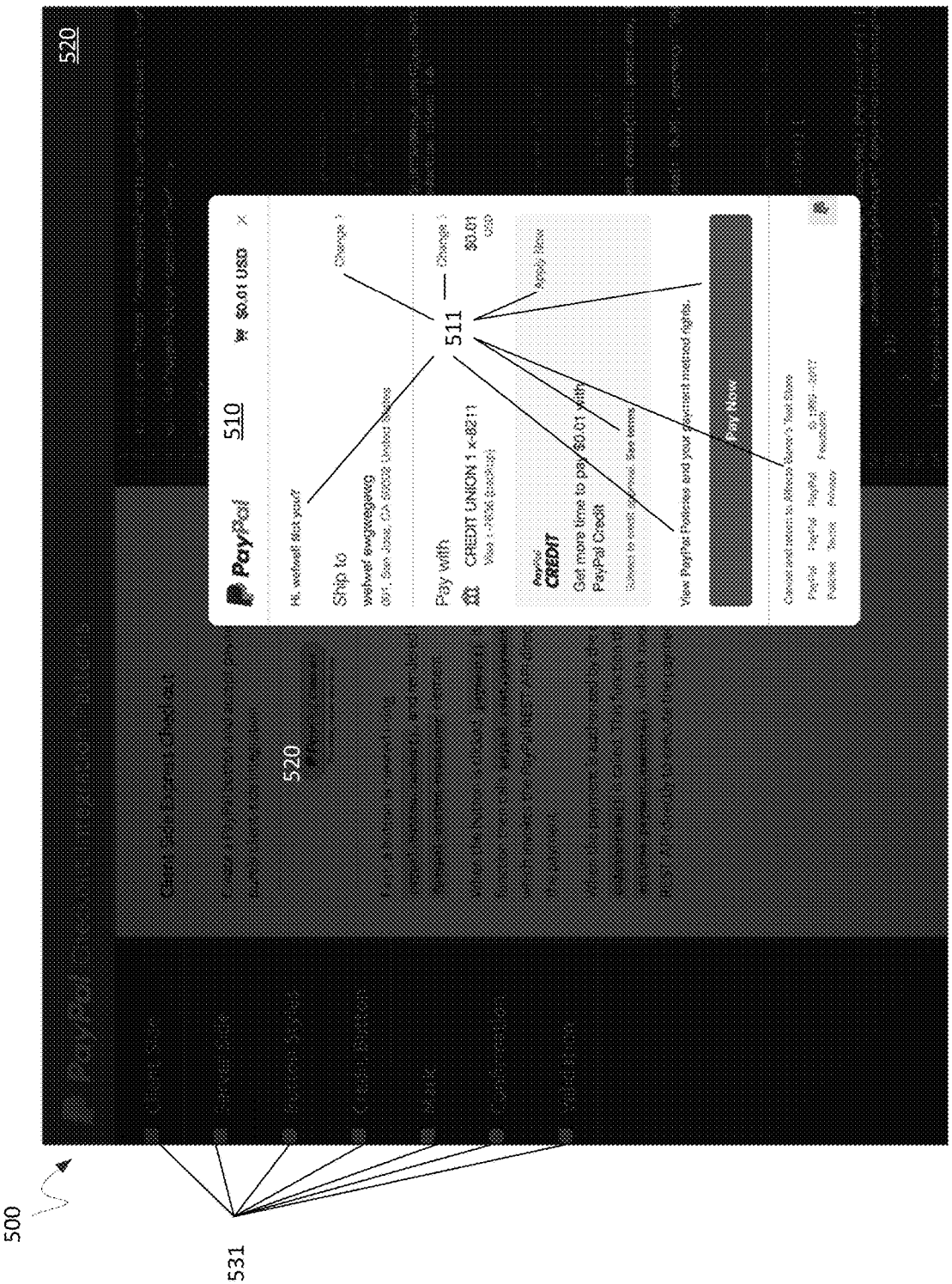
FIG. 5 illustrates additional iframe elements and functionalities that may be used as part of the process discussed in FIG. 3.

FIG. 5 illustrates an example webpage covered by child iframe 500 that may be used as part of process 300 of FIG. 3. As shown child iframe 500 may have an interactive portion 510, which a user may interact with through their user device. Child iframe 500 may include one or more actuatable elements 511. In some examples, these actuatable elements may be links to different webpage URLs. In some examples, these actuatable element may create additional child iframes with content hosted by the service provider system or other systems. The actuatable elements may allow the user to change settings, complete a service, cancel a service, edit a service, and/or the like.

Furthermore, child iframe 500 may include a passive portion 520 that is semitransparent but greys out and/or darkens the webpage sitting behind iframe 500. Passive portion 520 may prevent the user from interacting with the webpage that child iframe 500 is overlaying on top of, and effectively commandeer the webpage from the third-party. For example, the webpage may include actuatable elements 531 that iframe 500 greys out through passive portion 520 and prevents a user from interacting with through the user device because it is behind child iframe 500. Note that in this example, iframe 500 covers the entirety of the webpage behind it. Iframe 500 includes interactive portion 510 and passive portion 520, but not the webpage behind it.

Although, in this example, iframe 500 has an interactive portion 510 and passive portion 520, other arrangements are possible. For example, the size of interactive portion 510 could increase to encompass the entire webpage without passive portion 520 or vice versa. Furthermore, passive portion 520 could be made opaque rather than partially transparent, thus completely hiding the webpage behind it. In some examples, passive portion 520 may be a different iframe than interactive portion 510, with interactive portion 510 layered on top of passive portion 520. Many other arrangements are possible, but are not listed for the sake of brevity, however, such additional arrangements would be readily apparent to one of ordinary skill in the art reading this disclosure, and such additional arrangements are intended to be covered by this disclosure.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the use of parent and child iframes; however, there may be additional child iframes spawned from child iframes. Furthermore, some examples include having the service provider system hosting the iframes, but other embodiments may have additional systems in conjunction with or instead of the service provider system to host one or more iframes. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising:
a non-transitory memory; and
one or more hardware processors coupled to the non-transitory memory and configured to read instructions from the non-transitory memory to cause the system to perform operations comprising:
providing first programming code that can be edited at a remote server to generate an edited first programming code that defines a first set of customizations for a first customized checkout button, the first set of customizations causing a first portion of a first aspect of style of the first customized checkout button to match a second aspect of style for a webpage hosted by the remote server, wherein the edited first programming code can be used as part of the webpage that is hosted by the remote server, the edited first programming code executable by a user device when accessing the webpage to cause the user device to send one or more API calls to the system that is separate from the remote server that hosts the webpage;
receiving the one or more API calls and one or more identification tokens from the user device, wherein the one or more API calls include webpage instructions including a second set of customizations for the first customized checkout button, the second set of customizations causing a second portion of the first aspect of style of the first customized checkout button to match the second aspect of style for the webpage hosted by the remote server, and wherein the one or more identification tokens distinguish the user device and the webpage from other user devices and webpages;
in response to receiving the one or more API calls and the one or more identification tokens, determining that the webpage is registered, by comparing the one or more identification tokens with tokens in a token database, and obtaining an account balance for a user account associated with the user device and sending second programming code to the user device that enables a first iframe containing the first customized checkout button, including both the first and second set of customizations, to be generated in response to being executed by the user device, the first iframe and the first customized checkout button being hosted and controlled by the system and being displayed as part of the webpage,
wherein one of a plurality of checkout processes is associated with a particular payment method, and wherein the particular payment method is selected based on both the account balance for the user account and user device information,
wherein the first customized checkout button is personalized based on user-identifying information, and
wherein a use of the particular payment method for a purchase and at least one customization of the second set of customizations for the first customized checkout button is determined based both on the account balance and prior to receiving a user input that initiates a checkout process at the user device;
receiving the user input at the user device via the first iframe, the user input including an actuation of the first customized checkout button to initiate the one of the plurality of checkout processes using the particular payment method; and
in response to receiving the user input, communicating one or more commands to the user device via the first iframe to cause the user device to generate a second iframe, the second iframe being hosted by the system.

2. The system of claim 1, wherein the operations further comprise receiving the user device information from the user device and in response to receiving the user device information, generating the first customized checkout button in the first iframe.

3. The system of claim 1, wherein the edited first programming code further causes the user device to generate the second iframe in response to receiving the one or more commands, the one or more commands including commands for generation of the second iframe, from the system though the first iframe.

4. The system of claim 1, wherein the edited first programming code further causes the user device to anticipate a command from the system to trigger the user device to generate the second iframe.

5. The system of claim 1, wherein the operations further comprise populating the second iframe with user information and a second customized checkout button, and wherein the second customized checkout button is selected from a plurality of actuatable elements, the selection depending on the user device information received from the user device.

6. The system of claim 1, wherein the first customized checkout button is further personalized based on a time since a user of the user device last logged in.

7. The system of claim 1, wherein the user-identifying information includes a user image, a user name, and the account balance for the user account.

8. The system of claim 1, wherein each of the webpage, the first iframe, and the second iframe have different levels of compliance with one or more security measures.

9. A method, comprising:
providing, by a service provider system, webpage source code that can be edited at a remote server to generate an edited webpage source code that defines a first set of customizations for a customized checkout button, the first set of customizations causing a first portion of a first aspect of style of the customized checkout button to match a second aspect of style for a webpage hosted by the remote server, wherein the edited webpage source code is configured for use as part of the webpage that is hosted by the remote server that is separate from the service provider system and executable by a user device when accessing the webpage that enables the user device to send one or more API calls to the service provider system;
receiving, by the service provider system, the one or more API calls and one or more identification tokens from the user device, wherein the one or more API calls include webpage instructions including a second set of customizations for the customized checkout button, the second set of customizations causing a second portion of the first aspect of style of the customized checkout button to match the second aspect of style for the webpage hosted by the remote server, and wherein the one or more identification tokens distinguish the user device and the webpage from other user devices and webpages;
in response to receiving the one or more API calls and the one or more identification tokens, determining, by the service provider system, that the webpage is registered, by comparing the one or more identification tokens with tokens in a token database and obtaining, by the service provider system, an account balance for a user account associated with the user device and sending programming code to the user device that enables a parent iframe containing the customized checkout button, including both the first and second set of customizations, to be generated in response to being executed by the user device, the parent iframe and the customized checkout button being hosted and controlled by the service provider system and being displayed as part of the webpage,
wherein one of a plurality of checkout processes is associated with a particular payment method, and wherein the particular payment method is selected based on both the account balance for the user account and user device information,
wherein the customized checkout button is personalized to include at least one of a user image, a user name, or the account balance for the user account, and
wherein at least one customization of the second set of customizations for the customized checkout button and the particular payment method are determined based both on the account balance and prior to receiving a user input that initiates a checkout process at the user device through the parent iframe;
receiving, by the service provider system, the user input at the user device through the parent iframe, the user input including a selection of the customized checkout button to initiate the one of the plurality of checkout processes using the particular payment method; and
in response to receiving the user input, communicating, by the service provider system, one or more commands to the user device through the parent iframe that enables the user device to generate a child iframe, the child iframe being hosted by the service provider system.

10. The method of claim 9, wherein the parent iframe is generated as part of a plurality of generated iframes.

11. The method of claim 9, further comprising
receiving the user device information;
determining one or more services associated with a user based at least in part on the user device information;
in response to determining the one or more services associated with the user, determining a button associated with the one or more services; and
causing the user device to display the button.

12. The method of claim 9, wherein the user device information includes information about an application installed on the user device.

13. The method of claim 11, wherein the button is displayed on the user device through the child iframe, and wherein the user input is received in response to receiving an indication of an actuation of the button.

14. The method of claim 9, further comprising providing the one of the plurality of checkout processes through the child iframe.

15. The method of claim 9, further comprising commandeering a user experience with the webpage through the child iframe.

16. A non-transitory machine-readable medium having stored thereon machine-readable instructions executable to cause a machine to perform operations comprising:
receiving one or more API calls and one or more identification tokens from a user device based on a first programming code provided for editing at a remote server to generate an edited first programming code that defines a first set of customizations for a first customized checkout button, the first set of customizations causing a first portion of a first aspect of style of the first customized checkout button to match a second aspect of style for a webpage hosted by the remote server, wherein the one or more identification tokens distinguish the user device and the webpage from other user devices and webpages, wherein the edited first programming code is used as part of the webpage that is hosted by the remote server, the edited first programming code executable by the user device when accessing the webpage that enables the user device to send the one or more API calls and the one or more identification tokens to a service provider system that is separate from the remote server that hosts the webpage, wherein the one or more API calls include webpage instructions including a second set of customizations for the first customized checkout button, the second set of customizations causing a second portion of the first aspect of style of the first customized checkout button to match the second aspect of style for the webpage hosted by the remote server;

in response to receiving the one or more API calls and the one or more identification tokens, determining that the webpage is registered, by comparing the one or more identification tokens with tokens in a token database and obtaining an account balance for a user account associated with the user device and sending second programming code to the user device that enables the user device to generate a first iframe containing the first customized checkout button, including both the first and second set of customizations, in response to being executed by the user device, the first iframe and the first customized checkout button being hosted and controlled by the service provider system and being displayed as part of the webpage, wherein one of a plurality of checkout processes is associated with a particular payment method, and wherein the particular payment method is selected based on both the account balance for the user account and user device information, wherein the first customized checkout button is personalized to include one or more of a user image, a user name, or the account balance for the user account, and wherein at least one customization of the second set of customizations for the first customized checkout button and the particular payment method are determined based both on the account balance and prior to receiving a user input that initiates a checkout process at the user device through the first iframe;

receiving the user input at the user device through the first iframe, the user input including a selection of the first customized checkout button to initiate the one of the plurality of checkout processes using the particular payment method; and in response to receiving the user input, communicating one or more commands to the user device through the first iframe that enables the user device to generate a second iframe, the second iframe being hosted by the service provider system;

wherein the second iframe contains a second customized checkout button that includes at least one customization from each of the first set of customizations and the second set of customizations.

17. The non-transitory machine-readable medium of claim 16, wherein the second iframe commandeers a portion of a viewport of a browser window.

18. The non-transitory machine-readable medium of claim 16, wherein the second iframe prevents actuation of actuatable elements of the webpage.

19. The non-transitory machine-readable medium of claim 16, wherein the second iframe changes a color of the webpage through an overlay.

20. The non-transitory machine-readable medium of claim 16, wherein the second iframe is customized based on information associated with the user account.

* * * * *